United States Patent [19]

Jeon et al.

[11] Patent Number: 5,159,250
[45] Date of Patent: Oct. 27, 1992

[54] ROBOT CONTROL METHOD

[75] Inventors: Byeong-Hwan Jeon, Suwon; Sung-Kwon Kim, Seoul, both of Rep. of Korea

[73] Assignee: Samsung Electronics Co., Ltd., Kyonggi, Rep. of Korea

[21] Appl. No.: 825,093

[22] Filed: Jan. 24, 1992

[30] Foreign Application Priority Data

Jan. 26, 1991 [KR] Rep. of Korea .................. 91-1347

[51] Int. Cl.$^5$ ............................................. G05B 19/18
[52] U.S. Cl. .............................. 318/568.11; 318/561; 318/569; 318/571; 318/616; 364/474.30; 395/80
[58] Field of Search ............................ 318/560–636; 901/3, 7, 8, 9, 12, 13, 15, 17–23; 364/513, 474.30

[56] References Cited

U.S. PATENT DOCUMENTS

| | | | |
|---|---|---|---|
| 3,870,939 | 3/1975 | Robert | 318/611 |
| 4,554,497 | 11/1985 | Nozawa et al. | 318/636 |
| 4,603,286 | 7/1986 | Sakano | 318/615 |
| 4,691,152 | 9/1987 | Ell et al. | 318/616 |
| 4,707,780 | 11/1987 | Gose et al. | 318/632 X |
| 4,893,068 | 1/1990 | Evan, Jr. | 318/615 |
| 4,916,636 | 4/1990 | Torii et al. | 318/568.18 X |
| 5,057,756 | 10/1991 | Hara | 318/569 |
| 5,070,287 | 12/1991 | Boehm | 318/569 |
| 5,073,748 | 12/1991 | Boehm | 318/569 |

FOREIGN PATENT DOCUMENTS 2-148111  6/1990  Japan .

Primary Examiner—Paul Ip
Attorney, Agent, or Firm—Burns, Doane, Swecker & Mathis

[57] ABSTRACT

A robot control method utilizing a convolution in which a calculating method is simple. Simultaneously, a synchronous operation of a multi-shaft system, such as a computerized numerical control machine tool or robot, is made easy by convolving an input displacement quantity to a previously defined torque locus. The method comprises a first step of seeking a filter characteristic function most suitable for the control system, a second step of storing the filter characteristic function obtained at said first step for producing an input signal with respect to a displacement quantity desired to drive the robot, a fourth step of convolving the filter characteristic function and the input signal with respect to the displacement quantity obtained at the first step and third step, a fifth step for seeking the position locus by integrating the speed locus obtained at the fourth step, and sixth step for driving the robot in response to the speed locus and the position locus obtained at the fourth step and fifth step.

4 Claims, 4 Drawing Sheets

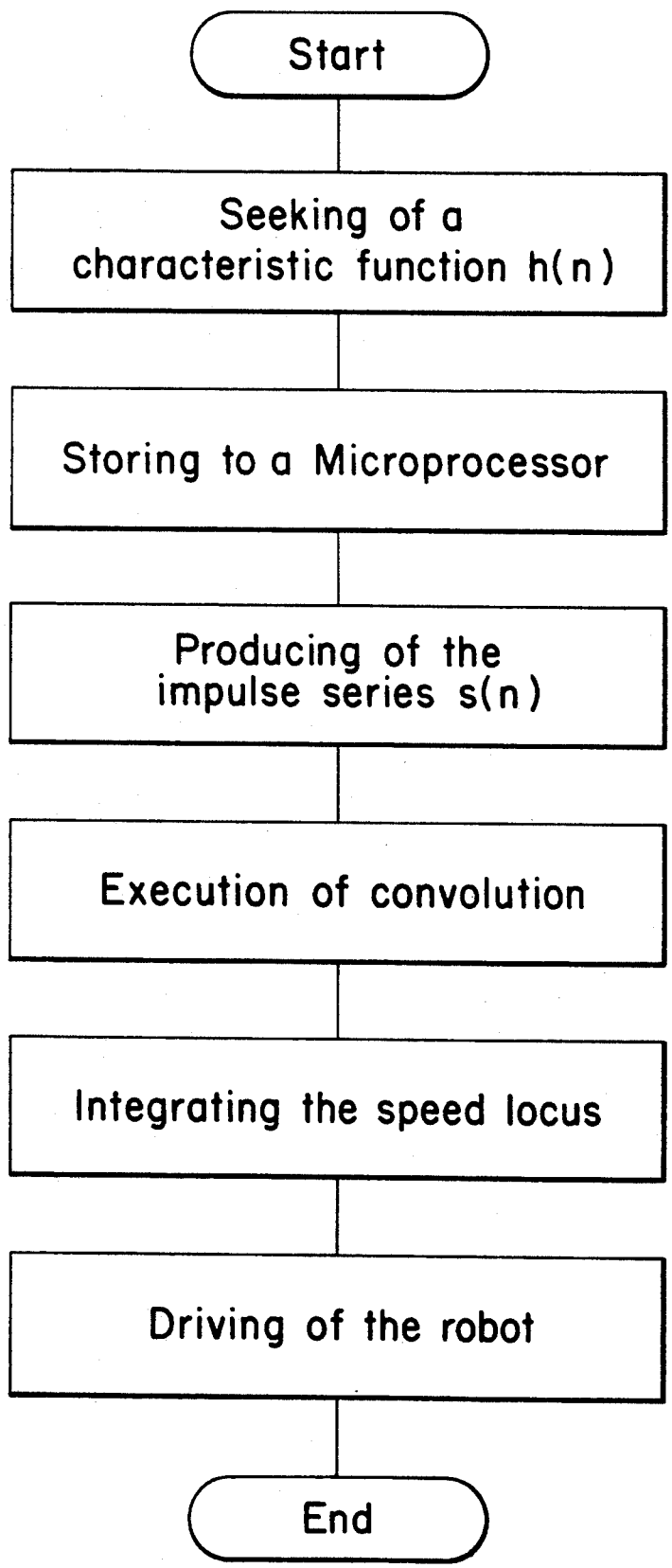

ROBOT CONTROL METHOD

FIELD OF THE INVENTION

The present invention relates to a control method applied to a computerized numeric control machine tool of robot, and more particularly, to a robot control method for controlling a robot by convoluting a characteristic function in a filter and an input voltage waveform and by utilizing an output voltage waveform produced by the convolved result.

PRIOR ART

Conventionally, a robot control method utilizes either a speed locus of trapezoid made of an acceleration section being made of a positive (+) ramp function, an even speed section being made of constant function indicating steady speed, and a deceleration section made of negative (−) ramp function or utilizing a multinominal expression, the speed locus utilized here being equivalent with an applied voltage waveform.

Specifically, in accordance with the prior art described in Japanese patent laid open publication Hei 2-148111 as shown in FIG. 1, robots have been controlled by utilizing a trapezoidal speed locus having a linear section, and the speed locus utilized here is equivalent with an applied voltage waveform.

However, according to the control method of such conventional technique, in a relation of speed (V) versus time (t), since the speed was discontinuously and rapidly changed at points A, B, C, and D as shown in FIG. 1, the method has produced a vibration upon driving the robot, and there has been a problem in that control of the robot to an absolute position was difficult.

This is explained in more detail as follows. When a speed function shown in FIG. 1 is differentiated, an acceleration function shown in FIG. 2 is obtained, and since this function is proportional to an electric current, it can be said that it is equivalent to a current waveform.

Accordingly, the robot is operated without problem when a waveform current, such as shown as an acceleration locus of FIG. 2, is applied. However, in practice there has been a problem in that it was difficult to apply a current of same waveform as an acceleration locus of FIG. 2. That is, a current corresponding to the acceleration of FIG. 2 should be applied in an accelerated section of FIG. 1, but an overshoot current corresponding to $a_{f2}$ is applied due to an inertia, and the acceleration becomes 0 in an even speed section, but the current does not stop at 0 point due to an inertia, and an overshoot current corresponding to $a_{f2}$ is applied.

Also, a current corresponding to an acceleration $-a_r$ should be applied in an acceleration section, but it is possible to know that an overshoot current corresponding to $a_{f3}$ is applied due to an inertia, as similarly described above. Thus, in a section including an overshoot current, an overshot is produced in which the robot leaves a target zone due to inertia. As a result, a problem was occurred that the robot vibrates too much.

Moreover, heretofore this problem, as well as the desire to have an area of linear acceleration and deceleration curve integrated in order to obtain a target position in any voluntary sampling time, had been unresolved. Additionally, in this case, only the E portion shown in FIG. 1 is calculated, which is a below portion of a linear locus, while its remaining F portion is not calculated. Therefore, there has been a problem that an absolute position control of the robot was difficult.

OBJECT AND SUMMARY OF THE INVENTION

The present invention is made considering various problems described above, and an object of the present invention is to provide a robot control method for convoluting a maximum speed value produced in determining an output of the robot driving means considering a previously defined position, and a characteristic function of digital filter related to this numerical value. Thereafter, the method involves controlling the robot without vibration by utilizing an output occurring as the filter's result and realizing a so-called synchronous operation in which a multiplicity shafts for driving a robot move simultaneously and stop at the same time.

Another object of the present invention is to provide a robot control method for utilizing a convolution capable of continuously executing speed and position control by controlling an acceleration of a motor, i.e., at torque level, to improve precision.

In order to attain the above-described object, a robot control method utilizing a convolution according to the present invention is characterized by: a first step of seeking a filter characteristic function most suitable for a control system, a second step of storing the filter characteristic function obtained at the first step to a memory device, a third step of producing an input signal according to a displacement quantity, a fourth step of convolving the input signal, a fifth step of seeking a position locus by integrating a speed locus, and a sixth step for driving the robot in response to the position locus and speed locus obtained at said fourth step and fifth step.

BRIEF DESCRIPTION OF THE DRAWINGS

FIG. 7 is a flow chart illustrating an operating sequence of the present invention.

DETAILED DESCRIPTION OF THE PREFERRED EMBODIMENT

Hereinafter, a preferred embodiment of the present invention will be described in detail with reference to the accompanying drawings.

Figure 3:
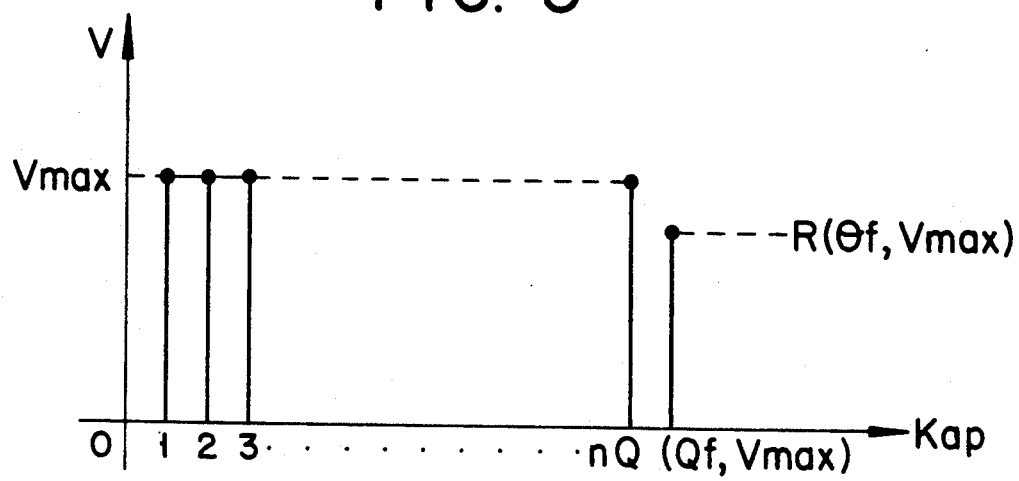
FIG. 3 is a graph of maximum speed representing by unit hour according to the present invention.
Figure 4:
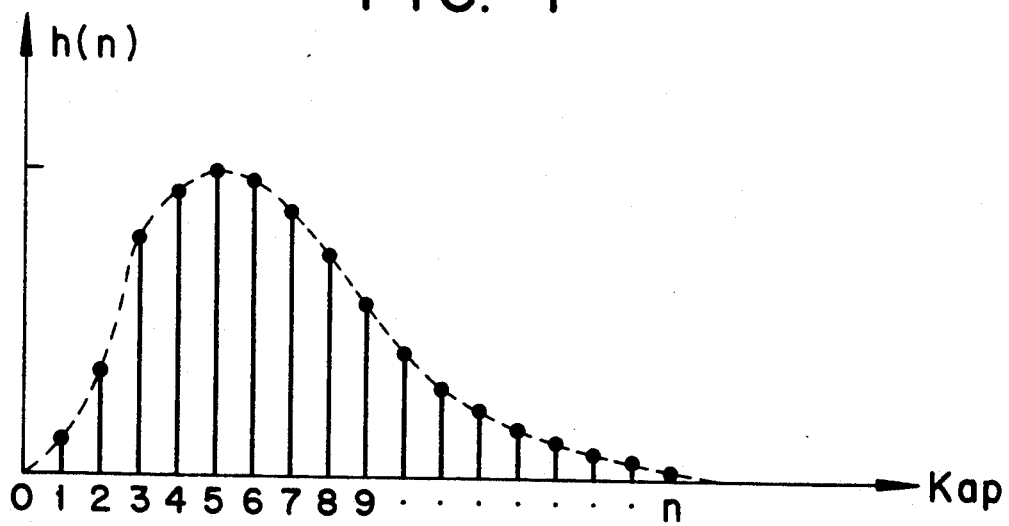
FIG. 4 is a graph showing a characteristic function in a filter.
Figure 5:
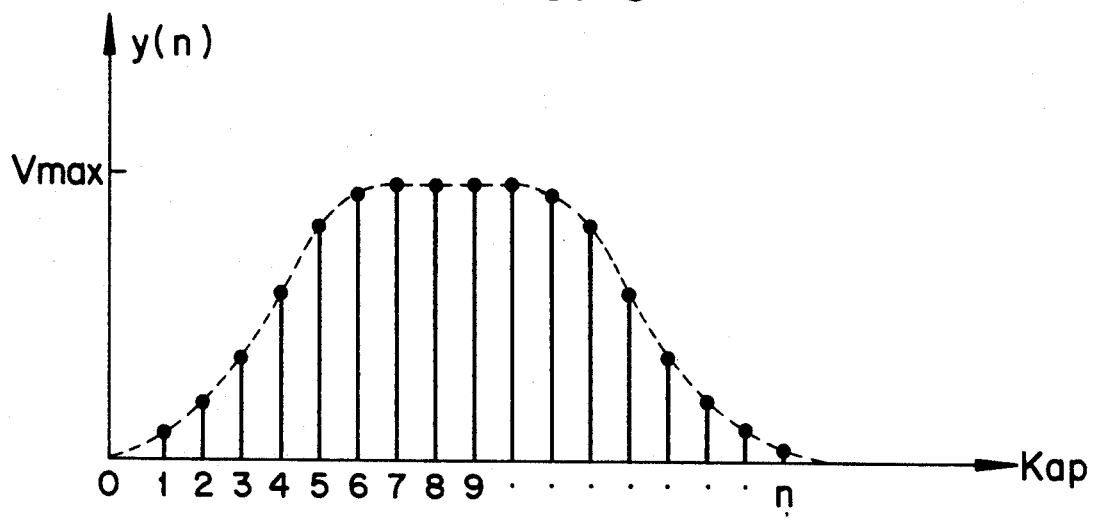
FIG. 5 is a diagram of speed locus obtained by a convolution of the present invention.
Figure 6:
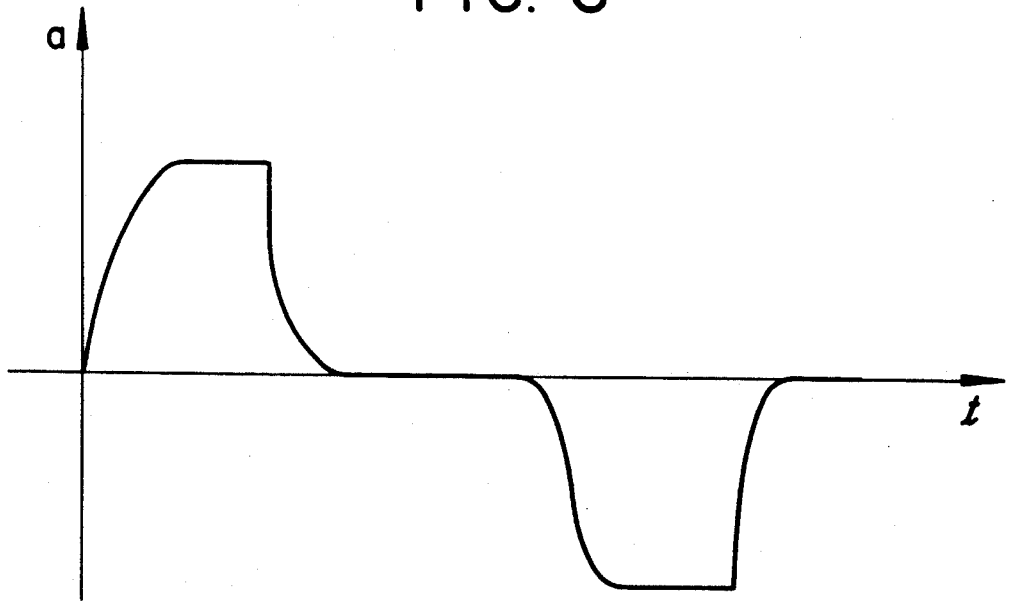
FIG. 6 is a diagram of acceleration locus related to FIG. 5.

FIG. 3 is a graph illustrating maximum speed by sampling to form a digitalized impulse series having a predetermined period. FIG. 4 is a graph illustrating a characteristic function of filter formed by sampling an impulse series having a digitalized magnitude as a same period as the period sampled in FIG. 3. FIG. 5 shows a speed locus obtained by convolution in accordance with the present invention. FIG. 6 is a diagram of an acceleration locus illustrating the speed locus shown in FIG. 5 by differentiating it with time, and FIG. 7 is a flow chart illustrating an operation sequence of the present invention.

Firstly, a convolution applied to the present invention will be explained as follows. When an impulse series of speed having a digitalized magnitude as an equivalence to a driving voltage is put as x[n], and a function exhibiting a characteristic function of filter related with the impulse series of this speed into an impulse series having a digitalized magnitude is put as h[n], a speed locus y[n] obtainable by convolution of given two functions (x[n], h[n]) is defined as follows.

$$y[n] = x[o]h[n] + x[i]h[n-1] + \ldots x[k]h[n-k] \ldots + x[n]h[o] \quad (1)$$

The above expression (1) is represented by a binary operator (*) as follows.

$$y[n] = x[n] * h[n] \quad (2)$$

Since this invention deals with digitized magnitudes as its subject, this is called a discrete convolution.

On the other hand, when representing the discrete convolution of said expression (1) and expression (2) by summation, they are as follows.

$$y[n] = x[n] * h[n] = \sum_{k=0}^{n} x[k]h[n-k] \quad (3)$$
$$= \sum_{k=0}^{n} x[n-k]h[k]$$
$$= h[n] * x[n]$$

The present invention will be described with reference to the convolution with respect to the impulse series as described above.

When a position displacement quantity $\theta f$ of a robot arm (being a previously given input condition) is put as a maximum speed Vmax according to a capacity of the robot and when said position displacement quantity $\theta f$ is divided by a maximum speed Vmax and thereafter its value is represented by an impulse series sampled by a predetermined period, the impulse series x[n] of a maximum speed Vmax, as shown in FIG. 3, can be produced.

When a value that a time duration capable of representing said speed impulse series x[n] via an integer, i.e., the position displacement quantity $\theta f$ is divided by a maximum speed Vmax is represented as Q ($\theta f$, Vmax), and a value representing the speed impulse series x[n] via decimal point is represented as R($\theta f$, Vmax), a relation of a remaining value represented by decimal point and maximum speed is as follows.

That is, $0 \leq R(\theta f, Vmax) < Vmax$ (5)

Accordingly, when an impulse series from n=0 to n=Q ($\theta f$, Vmax) excluded with remaining value R($\theta f$, Vmax) of Q ($\theta f$, Vmax) time from the impulse series x[n] is represented via unit signal $\beta[n]$, it is as follows.

$$x[n] = Vmax (\mu[n] - \mu[n - Q (\theta f, \theta max)]) \quad (6)$$

On the other hand, a function h[n] representing the characteristic function of filter into an impulse series having a digitalized magnitude determines experimentally and theoretically a torque wave form most suitable for the control system, and this characteristic function is stored to a ROM or RAM of a microprocessor.

Thus, when the characteristic function h[n] of filter stored in ROM or RAM is convoluted with the speed function x[n] with respect to the displacement quantity $\theta f$ desired to drive by the robot, the speed locus as shown in FIG. 5 is obtained.

That is, $$y[n] = x[n] * h[n] \quad (7)$$
$$= \sum_{k=0}^{n} x[k]h[n-k]$$
$$= \sum_{k=0}^{n} Vmax(\mu[k] - \mu[k - Q(\theta f, Vmax)])h[n-k]$$
$$= \sum_{k=0}^{n} Vmax(h[n-k] - h[n-k - Q(\theta f, Vmax)])$$

When the speed locus value obtained as above expression (7) is integrated, the position displacement quantity can be obtained, and when this is differentiated, the acceleration locus as shown in FIG. 6 can be obtained.

Figure 1:
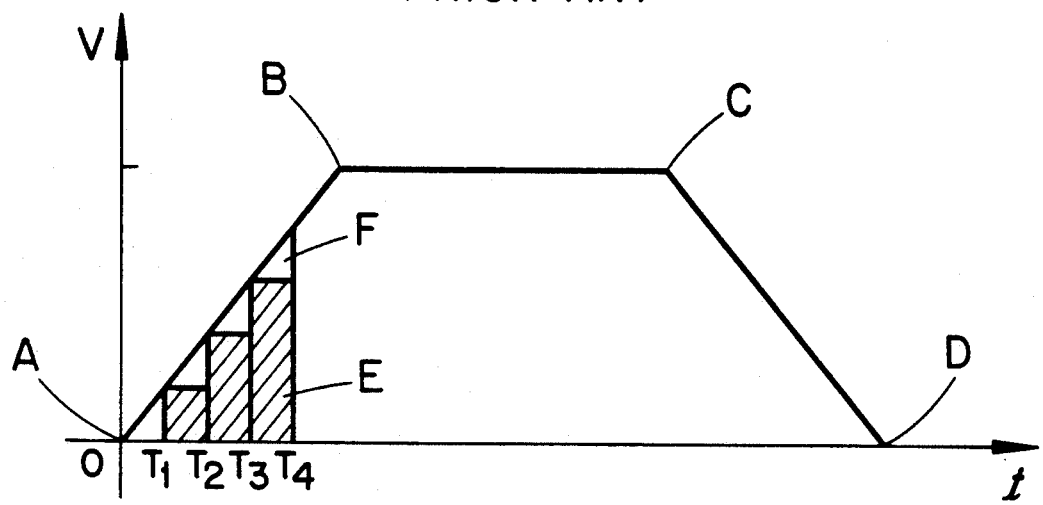
FIG. 1 is a diagram of a conventional speed locus for control of conventional robot.
Figure 2:
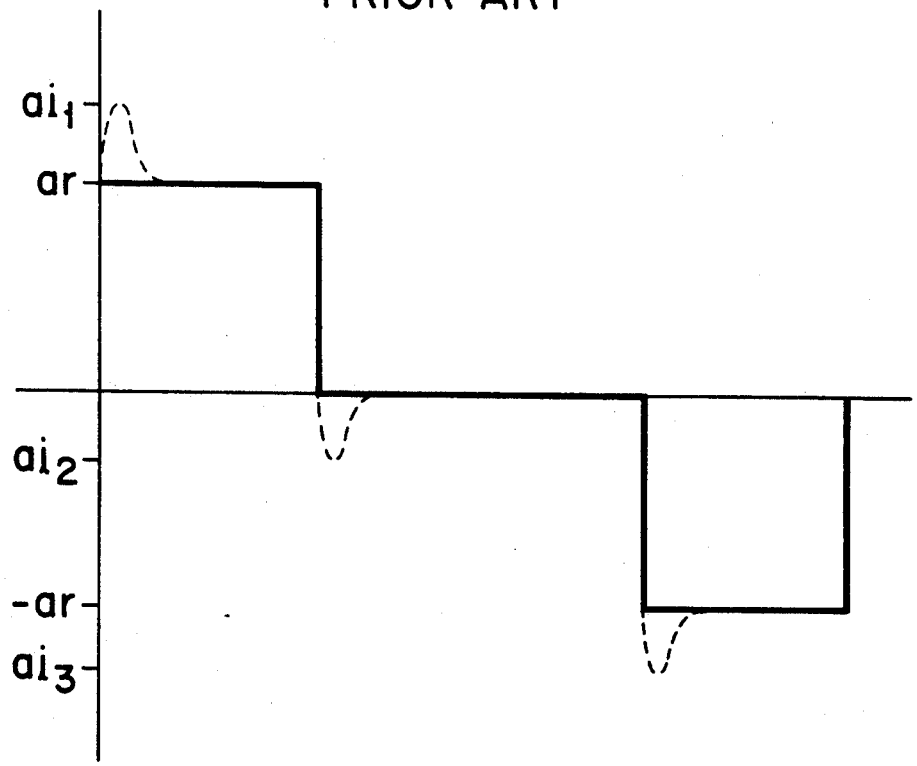
FIG. 2 is a diagram of acceleration locus related to FIG. 1.

Since the acceleration waveform shown in FIG. 6 has a continued characteristic different from the conventional acceleration waveform shown in FIG. 2, the robot can be linearly controlled, and particularly the generation of the overshooting can be controlled. Therefore, the robot can be operated without any vibration.

An explanation of the sequence of operation of the robot control method according to the present invention is as follows.

As shown in FIG. 7, when the robot control method utilizing a convolution of the present invention is started, at a first step S1 a characteristic function h[n] of filter most suitable to the control system is sought, and at a second step S2 the characteristic function h[n] obtained at step S1 is stored to the ROM or RAM, which is a memory device of a microprocessor.

Next, at a third step S3 the maximum impulse series s[n] with respect to the position displacement quantity $\theta f$ desired to drive the robot by is produced and thereafter, at a fourth step S4 the speed locus with respect to the driving of the robot is obtained by convoluting the speed impulse series x[n] with respect to the displacement quantity $\theta f$ desired to drive by the robot and the characteristic function h[n] of filter stored to the microprocessor. At a fifth step S5 the position locus of the robot is sought by integrating the speed locus data value of the robot and then, at a sixth step S6 the regular driving of the robot is executed by the speed locus and the position locus of the robot obtained at said fourth step S4 and fifth step S5.

Thus, in accordance with the robot control method utilizing the convolution of the present invention, a realization of synchronous operation of the multi-shaft system is made easy, and the speed and position loci are made smooth. This results in an improved precision of the control, therefore improving operation to a maximum.

What is claimed is:

1. A robot control method comprising:
   a first step of seeking a filter characteristic function most suitable for a control system,
   a second step of storing the filter characteristic function obtained at said first step in a memory device,
   a third step of producing an input signal with respect to a displacement quantity desired to drive the robot, a fourth step of seeking a robot driving speed locus by convoluting the filter characteristic function and an input signal with respect to the displacement quantity obtained at said first step and third step, respectively, a fifth step of seeking the position locus by integrating the speed locus obtained at said fourth step, and a sixth step of driving the robot in response to the speed locus and the position locus obtained at said fourth step and fifth step, respectively.

2. A robot control method as defined in claim 1, wherein said memory device is a ROM of a microprocessor.

3. A robot control method as defined in claim 1, wherein said memory device is a RAM of a microprocessor.

4. A method for a robot control system comprising the steps of:

seeking a filter characteristic function most suitable for the control system;

producing an input signal according to a displacement quantity a robot is to be driven;

convolving said filter characteristic function and said input signal with respect to said displacement quantity to determine a robot driving speed locus;

integrating said robot driving speed locus to determine a position locus; and driving said robot in accordance with the robot driving speed locus and said position locus.

* * * * *